United States Patent
Park

(10) Patent No.: US 12,393,696 B2
(45) Date of Patent: Aug. 19, 2025

(54) APPARATUS AND METHOD FOR ANALYZING VULNERABILITIES OF SMART CONTRACT CODE

(71) Applicant: SOOHO.IO INC., Seoul (KR)

(72) Inventor: Ji Su Park, Seoul (KR)

(73) Assignee: SOOHO.IO INC., Seoul (KR)

( * ) Notice: Subject to any disclaimer, the term of this patent is extended or adjusted under 35 U.S.C. 154(b) by 199 days.

(21) Appl. No.: 18/253,152

(22) PCT Filed: Nov. 17, 2021

(86) PCT No.: PCT/KR2021/016833
§ 371 (c)(1),
(2) Date: May 16, 2023

(87) PCT Pub. No.: WO2022/108318
PCT Pub. Date: May 27, 2022

(65) Prior Publication Data
US 2023/0418951 A1    Dec. 28, 2023

(30) Foreign Application Priority Data
Nov. 17, 2020  (KR) .................. 10-2020-0153793

(51) Int. Cl.
*H04L 29/06* (2006.01)
*G06F 8/70* (2018.01)
*G06F 21/57* (2013.01)

(52) U.S. Cl.
CPC .............. *G06F 21/577* (2013.01); *G06F 8/70* (2013.01); *G06F 2221/033* (2013.01)

(58) Field of Classification Search
CPC .... G06F 21/577; G06F 8/70; G06F 2221/033; G06F 21/56; G06F 21/57; G06F 21/563
See application file for complete search history.

(56) References Cited

U.S. PATENT DOCUMENTS

| | | | |
|---|---|---|---|
| 11,074,650 B1* | 7/2021 | Madisetti | G06Q 20/3823 |
| 2004/0158820 A1* | 8/2004 | Moore | G06F 8/51 |
| | | | 717/136 |

(Continued)

FOREIGN PATENT DOCUMENTS

| | | |
|---|---|---|
| CN | 110659494 A | 1/2020 |
| JP | 11296366 A * | 10/1999 |

(Continued)

OTHER PUBLICATIONS

Josselin Feist et al., "Slither: A Static Analysis Framework for Smart Contracts", arXiv:1908.09878v1 [cs.SE] Aug. 26, 2019.

(Continued)

*Primary Examiner* — Shawnchoy Rahman
(74) *Attorney, Agent, or Firm* — Rabin & Berdo, P.C.

(57) ABSTRACT

The present invention provides an apparatus for analyzing vulnerabilities of smart contract code, the apparatus including: a meta-information extraction unit configured to extract meta-information about input code, which is source code of a smart contract; an intermediate representation language conversion unit configured to convert the input code into an intermediate representation language based on the meta-information extracted by the meta-information extraction unit; a code analysis unit configured to detect whether there is vulnerable code or a rule violation case by analyzing the input code converted into the intermediate representation language by the intermediate representation language conversion unit; and a vulnerability detection unit configured to generate a final vulnerability model by detecting a vulnerability based on the vulnerable code or the rule violation case detected by the code analysis unit, and also provides an analysis method using the apparatus.

21 Claims, 14 Drawing Sheets

(56) References Cited

U.S. PATENT DOCUMENTS

2006/0028670 A1* 2/2006 Amano ................ G06F 3/1288
    358/1.13
2019/0303541 A1   10/2019 Reddy et al.
2020/0374106 A1* 11/2020 Padmanabhan ..... H04L 63/0428
2021/0357891 A1* 11/2021 Kore ....................... G06F 21/10

FOREIGN PATENT DOCUMENTS

| KR | 101947760 B1 | 2/2019 |
| KR | 1020200051262 A | 5/2020 |
| KR | 1020200094618 A | 8/2020 |
| WO | 2022078632 A1 | 4/2022 |

OTHER PUBLICATIONS

Sangsoo Kim et al., "A study on Chaincode Security Weakness Detector in Hyperledger Fabric Blockchain Framework for IT Development", Journal of Green Engineering, vol. 10, Issue 10, pp. 7820-7844, Oct. 2020.

Andrei Zhukov et al., "SmartGraph: Static Analysis Tool for Solidity Smart Contracts", Jun. 29, 2023, Computational Science and Its Applications—ICCSA 2023 Workshops, p. 584-598, Springer Nature Switzerland.

European Search Report dated Apr. 24, 2025, in the counterpart European Patent Application No. 23213797.6.

\* cited by examiner

| Input code file | Meta-information | Convertibility |
|---|---|---|
| Ethereum Solidity file (.sol) | 1) Solidity<br>2) 0.5.0<br>3) Ethereum | Possible |
| Hyperledger Fabric-based go file (.go) | 1) Go<br>2) Chaincod/shim:1.4<br>3) Hyperledger fabric | Possible |
| Unknown blockchain-based java file (.java) | 1) Java<br>2) Unknown<br>3) Unknown | Impossible |

| Input code file | Abstract syntax tree |
|---|---|
| 1 + 2*(3+4) | 1  - int<br>+  - add_operator<br>2  - int<br>*  - mul_operator<br>(  - lparen<br>3  - int<br>+  - add_operator<br>4  - int<br>)  - rparen |

| Input code | function ( ) external returns ( ) {<br>   require(msg.sender != wrappedEtherContract)<br>   depositEther( )<br>} |
|---|---|
| Intermediate representation language | function ( ) external returns ( ) {<br>   if ((msg.sender != wrappedEtherContract)) {depositEther( );} else{skip;}<br>} |

FIG. 8

- Convert require statement into if{statements}{skip};{throw;}
- Add whenNotPaused, whenPaused, and/or the like as modifier call statements
- Parenthesize in accordance with all operator precedence
- Convert for loop into while loop
- Convert do-while loop into while loop

FIG. 9

| Code pattern information ID (Input code ID_platform_ language_version_No) | Code pattern information |
|---|---|
| SOOHO_ethereum_ solidity_0.4.6_1 | <input code ID, version, statement, statement md5 hash, start line, end line> |
| SOOHO_ethereum_ solidity_0.4.6_2 | <input code ID, version, function name, function body, function body md5 hash, start line, end line> |
| SOOHO_ethereum_ solidity_0.4.6_3 | <input code ID, version, function name including block, function-based block No., block body, block body md5 Hash, start line, end line> |
| SOOHO_ethereum_ solidity_0.4.6_4 | <input code ID, version, value of reference token n, statement, statement md5 hash, start line, end line> |

FIG. 12

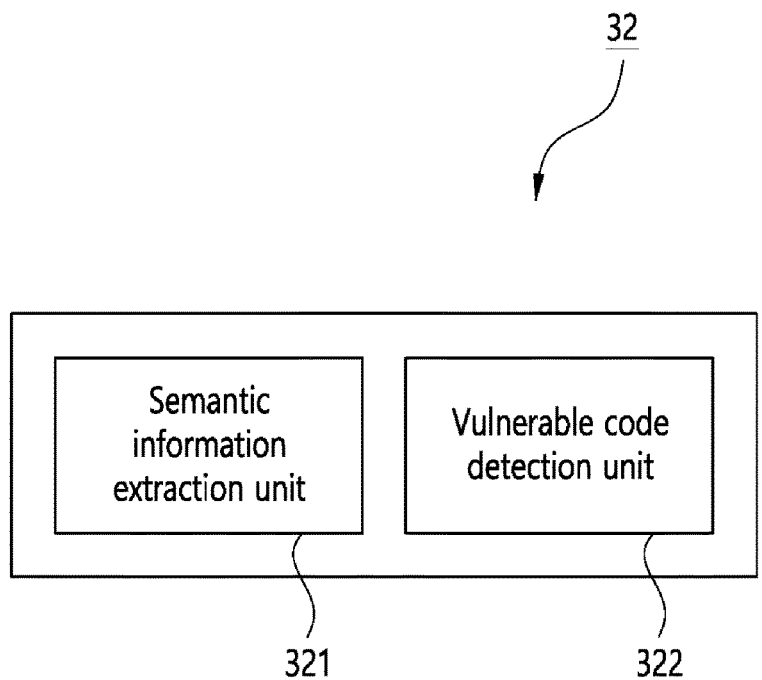

FIG. 13

Variable management table

| variable | vId | Type | isbalance | isOwner |
|---|---|---|---|---|
| X | 0 | Int | FALSE | FALSE |
| Y | 1 | Int | FALSE | TRUE |
| Z | 2 | int | TRUE | FALSE |

Variable value table

| vId | minValue | maxValue |
|---|---|---|
| 0 | $-\infty$ | $\infty$ |
| 1 | 0 | $\infty$ |
| 2 | -100 | 100 |

FIG. 14

Source Program:                                    CFG:

```
int binsearch (int x, int v [ ], int n)
{
    |   int low, high, mid;
  1 |   low = 0;
    |   high = n - 1;
    |   while (low <= high) | 2
        {
      3 |   mid = (low + high) /2;
        |   if ( x < v[mid])
        |       high = mid - 1;   | 4
      5 |   else if (x > v[mid])
        |       low = mid + 1;    | 6
      7 |   else return mid;
        }
        return -1;  | 8
} | 9
```

[Example of vulnerability detection using variable value information]

(a)

| Rule No. | Name | Description |
| --- | --- | --- |
| 1 | Integer overflow | When the addition or multiplication operation of $(-\infty,\infty)$-type variable and $(-\infty,\infty)$-type variable occurs |
| 2 | Uninitialized variable | When variable is present but representation of variable value is null |
| 3 | Use block.timestamp | When representation value of variable is block.timestamp value |
| 4 | Inappropriate Balance | When Balance is smaller than or equal to 0 |

[Example of vulnerability detection using CFG information]

(b)

| Rule No. | Name | Description |
| --- | --- | --- |
| 1 | Unused variable | When an unreachable node is present |
| 2 | Excessive amount of gas is required | When excessive number of nodes are present (In this case, blockchain gas consumption is high, so that there may be a case that does not operate at all, as in denial of service) |
| 3 | reentrancy | When a node calls external contract (.call, .delegate, .send, or the like) even when it is not a leaf node |

FIG. 16

| Attribute | Type | Default | Description |
|---|---|---|---|
| Name | String | Null | Vulnerability name |
| Severity | Enum<String> <"Critical", "High", "Medium", "Low"> | "Note" | Severity of vulnerability |
| References | Array<String> | Empty array | CVE-id, URL, CWE |
| Patch information | Array<String> | Null | Patch method(.diff format) |
| CWE_ID | int | Null | CWE-based vulnerability classification ID |
| SWC_ID | int | Null | SWC-based vulnerability classification ID |
| Start line | int | Null | Vulnerability-related code start line No. |
| End line | int | Null | Vulnerability-related code end line No. |

FIG. 18

APPARATUS AND METHOD FOR ANALYZING VULNERABILITIES OF SMART CONTRACT CODE

TECHNICAL FIELD

The present invention relates generally to an apparatus and method for analyzing the vulnerabilities of smart contract code, and more particularly to an apparatus and method for analyzing the vulnerabilities of smart contract code that can conveniently and efficiently analyze vulnerabilities that may occur in smart contract-based software operating on a blockchain.

BACKGROUND ART

As is well known, "blockchain" has the advantage of being able to block the forgery and falsification of transaction details by allowing a plurality of nodes to share and store a distributed ledger that stores transaction details without the intervention of a central server.

These blockchain platforms verify blocks by a consensus algorithm and pay crypto-currency for a generated node as a reward. For example, Bitcoin and the like are well known.

Recent blockchain technology is evolving from the stage of exchanging values without an intermediary using a distributed ledger like Bitcoin to the stage of executing a decentralized application (DApp; hereinafter also referred to as "DApp") in a distributed manner by recording the results of execution of a Turing-complete programming language in a distributed ledger. The decentralized application is characterized in that it can provide various services through the operation of a DApp installed on each user's computer without the intervention of a server through a peer-to-peer network directly connected between users' computers.

For example, a platform such as Ethereum is a representative example. To use this platform, a user can trade Ethereum, i.e., the platform's base token, and tokens issued by each DApp, pay the tokens to the DApp, and receive services.

A method of implementing a blockchain in conventional technologies such as Bitcoin and Ethereum will be described in detail. Each of the blocks constituting a blockchain stores transaction information, which is information about transaction details between users through a blockchain system, may be composed of a block header and a transaction, and is generated through proof-of-work by so-called miner nodes and included in the blockchain.

Meanwhile, unlike conventional blockchain platforms, such as Bitcoin, storing only simple transaction details, the Ethereum blockchain platform stores a "smart contract" composed of code by programming, allows the smart contract to be executed on a node constituting a part of the blockchain system, and also allows transaction details based on the execution result of the smart contract to be reflected in the blockchain.

However, the smart contract is written in a specific language by programming, and various vulnerabilities may occur due to one or more errors in source code and/or one or more mistakes in writing. In particular, since Ethereum-based tokens use smart contracts, security problems such as hacking may occur when there are vulnerabilities in smart contracts, resulting in serious economic damage. Therefore, it is significantly important to check a smart contract for vulnerabilities in advance.

However, conventional vulnerability analysis technologies have a limitation in that it is impossible to analyze the vulnerabilities of smart contract-based software operating on a blockchain. Therefore, there is a need for the development of a separate vulnerability analysis system based on a smart contract environment.

DISCLOSURE

Technical Problem

The present invention has been conceived to overcome the above-described problems, and an object of the present invention is to provide an apparatus and method that can conveniently and efficiently analyze vulnerabilities that may occur in smart contract-based software operating on a blockchain.

Another object of the present invention is to provide an apparatus and method that can simultaneously analyze vulnerabilities on multiple platforms based on an intermediate representation language maintaining the semantics of various smart contracts.

Technical Solution

In order to accomplish the above objects, the present invention provides an apparatus for analyzing vulnerabilities of smart contract code, the apparatus including: a meta-information extraction unit configured to extract meta-information about input code, which is source code of a smart contract; an intermediate representation language conversion unit configured to convert the input code into an intermediate representation language based on the meta-information extracted by the meta-information extraction unit; a code analysis unit configured to detect whether there is vulnerable code or a rule violation case by analyzing the input code converted into the intermediate representation language by the intermediate representation language conversion unit; and a vulnerability detection unit configured to generate a final vulnerability model by detecting a vulnerability based on the vulnerable code or the rule violation case detected by the code analysis unit.

In this case, the meta-information may include at least one of blockchain platform information, programming language information, and version information.

Furthermore, the intermediate representation language conversion unit may include: a convertibility determination unit configured to determine whether the input code can be converted into an intermediate representation language based on the meta-information extracted by the meta-information extraction unit; and a conversion performance unit configured to convert the input code into an intermediate representation language when it is determined by the convertibility determination unit that the input code can be converted into an intermediate representation language.

Furthermore, the conversion performance unit may include: an abstract syntax tree generation unit configured to generate an abstract syntax tree by parsing the input code; and an intermediate representation language generation unit configured to generate an intermediate representation language for the input code by traversing the abstract syntax tree, generated by the abstract syntax tree generation unit, through a visitor.

Furthermore, the code analysis unit may include a number of code analysis units corresponding to the number of pieces of the meta-information extracted by the meta-information extraction unit.

Furthermore, the code analysis unit may include: a code pattern information-based analysis unit configured to detect whether there is vulnerable code or a rule violation case based on the code pattern information of the input code converted into the intermediate representation language; and a semantic information-based analysis unit configured to detect whether there is vulnerable code or a rule violation case based on at least one of the variable tracking information, execution flow information, and conditional expression information of the input code converted into the intermediate representation language.

Furthermore, the code pattern information-based analysis unit may include: a code pattern information extraction unit configured to extract the code pattern information of the input code converted into the intermediate representation language; and a vulnerable code detection unit configured to detect whether there is a vulnerable code or a rule violation case based on the code pattern information extracted by the code pattern information extraction unit.

Furthermore, the code pattern information extraction unit may extract code pattern information, including a statement extracted on a per-line, per-function, per-block, and/or per-token basis from the input code converted into and expressed in the intermediate representation language, and the hash value, start line information and end line information of the extracted statement.

Furthermore, the vulnerable code detection unit may detect whether data that is the same as vulnerable code or rule data organized in a vulnerability database is present in the code pattern information extracted by the code pattern information extraction unit.

Furthermore, the vulnerability database may be generated by extracting meta-information by using vulnerable code and the line information of the vulnerable code as input, converting the input vulnerable code into the intermediate representation language based on the extracted meta-information, and extracting the code pattern information based on the line information of the vulnerable code.

Furthermore, the semantic information-based analysis unit may include: a semantic information extraction unit configured to extract semantic information including at least one of variable tracking information, execution flow information, and conditional expression information from the input code converted into and expressed in the intermediate representation language; and a vulnerable code detection unit configured to detect whether there is vulnerable code or a rule violation case based on the semantic information generated by the semantic information extraction unit.

Furthermore, the semantic information extraction unit may generate the variable tracking information by, when each variable is declared in the input code converted into the intermediate representation language, adding each variable to a variable management table and storing the range of values, which can be expressed by each variable, in a variable value table for each variable.

Furthermore, the vulnerable code detecting unit may detect a case where the variable value information included in the variable tracking information is an integer overflow or an uninitialized variable, a case where the representation value of a variable is a block.timestamp value, or a case where a balance is equal to or smaller than 0 as vulnerable code or a rule violation case.

Furthermore, the semantic information extraction unit may generate and store a control flow graph representative of the execution flow information.

Furthermore, the vulnerable code detection unit may detect a case where an unreachable node is present in the control flow graph, a case where a number of nodes larger than a preset value is present, or a case where an external smart contract is called even though it is not a leaf node as vulnerable code or a rule violation case.

Furthermore, the vulnerability detection unit may generate a final vulnerability model by, for detected vulnerability based on the code vulnerability or the rule violation case detected by the code analysis unit, generating a vulnerability model, removing duplicates, and performing prioritization.

Furthermore, the vulnerability detection unit may generate a vulnerability model by generating a syntactic vulnerability model from vulnerability information recorded in the code pattern vulnerability table generated by the vulnerable code detection unit of the code pattern information-based analysis unit, generating a semantic vulnerability model from vulnerability information recorded in the semantic vulnerability table generated by the vulnerable code detection unit of the semantic information-based analysis unit, representing the vulnerability model using the two models, and then adding additional information including severity information, references, and patch information.

Furthermore, the vulnerability detection unit, when parts of the input code detected as vulnerabilities have the same type of vulnerability and one of the parts is included in a remaining part, may determine the one part of the input code included in the other part to be duplicate and remove the one part, and, when parts of the input code having the same patch information are present, may determine any one of them to be duplicate and remove the any one part.

Furthermore, the vulnerability detection unit may arrange cases where patch information is present for vulnerabilities classified as "Critical," which corresponds to a most dangerous level of the severity information, in the highest order position, and may arrange a case where patch information is not present in the next highest order position.

Furthermore, the vulnerability detection unit may generate the final vulnerability model by arranging cases where patch information is present and severity information is "High," "Medium," or "Low" in the next order positions, arranging cases where patch information is present and severity information is "High," "Medium," or "Low" in the next order positions, and arranging cases where patch information is not present and severity information is "High," "Medium," or "Low" in the next order positions.

According to another aspect of the present invention, there is provided a method for analyzing vulnerabilities of a smart contract code, the method being performed by the apparatus for analyzing the vulnerabilities of smart contract code, the method including: a first step of extracting meta-information about input code, which is source code of a smart contract; a second step of converting the input code into an intermediate representation language based on the meta-information extracted in the first step; a third step of detecting whether there is vulnerable code or a rule violation case by analyzing the input code converted into the intermediate representation language in the second step; and a fourth step of generating a final vulnerability model by detecting a vulnerability based on the vulnerable code or the rule violation case detected in the fourth step.

Advantageous Effects

According to the present invention, there may be provided an apparatus and method that can conveniently and efficiently analyze vulnerabilities that may occur in smart contract-based software operating on a blockchain.

Furthermore, the present invention may provide an apparatus and method that can simultaneously analyze vulnerabilities on multiple platforms based on an intermediate representation language maintaining the semantics of various smart contracts.

Moreover, the present invention has an advantage in that an additional vulnerability analyzer may be easily added or removed.

DESCRIPTION OF DRAWINGS

FIGS. 8 and 9 show an example in which input code is converted into an intermediate representation language by an intermediate representation language generation unit (222);

FIG. 12 shows an example of code pattern information;

FIG. 13 is a diagram showing an example of the configuration of a semantic information-based analysis unit (32);

FIG. 14 is a diagram illustrating the operation of a semantic information extraction unit (321), and is intended to illustrate a process of extracting variable tracking information;

FIG. 16 is a diagram illustrating the operation of a vulnerable code detection unit (322);

FIGS. 17 and 18 are diagrams illustrating the operation of a vulnerability detection unit (40)

BEST MODE

Embodiments of the present invention will be described in detail below with reference to the accompanying drawings.

Figures 1, 2:
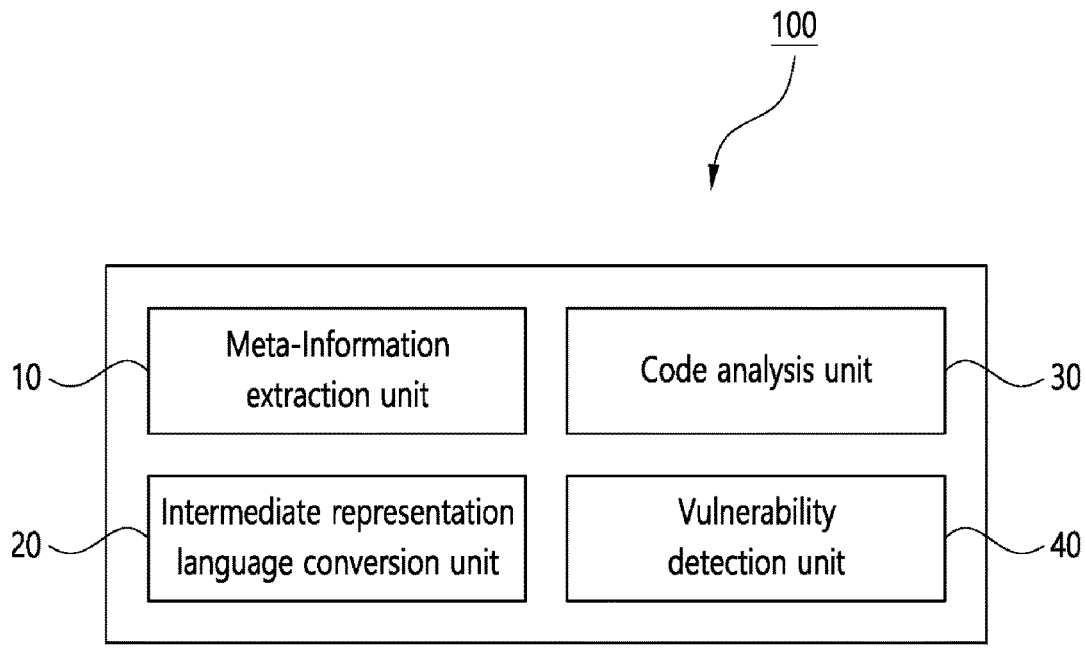
FIG. 1 is a diagram showing the overall configuration of an apparatus (100) for analyzing the vulnerabilities of smart contract code according to an embodiment of the present invention.
FIG. 2 is a diagram illustrating the operation of a meta-information extraction unit (10)

FIG. 1 is a diagram showing the overall configuration of an apparatus 100 for analyzing the vulnerabilities of smart contract code according to an embodiment of the present invention.

Referring to FIG. 1, the apparatus 100 for analyzing the vulnerabilities of smart contract code (hereinafter simply referred to as the "analysis apparatus 100") according to the present embodiment includes a meta-information extraction unit 10, an intermediate representation language conversion unit 20, a code analysis unit 30, and a vulnerability detection unit 40.

The meta-information extraction unit 10 performs a function of extracting meta-information about input code. In this case, the input code refers to the source code of a smart contract.

Since there may be a plurality of blockchain platforms supporting smart contracts, the meta-information extraction unit 10 extracts meta-information from input code in order to detect a blockchain platform on which a corresponding smart contract operates. The extracted meta-information may include, e.g., information such as blockchain platform information, a programming language information and a version information.

FIG. 2 is a diagram illustrating the operation of the meta-information extraction unit 10.

As shown in FIG. 2, for example, when input code is a solidity file (.sol) of Ethereum, the meta-information extraction unit 10 extracts language information through the file extension (.sol) of the file, and extracts version information while reading the file on a per-line basis.

The meta-information extraction unit 10 may estimate blockchain platform information, programming language information, and version information through this process. For example, meta-information such as "Ethereum" as the blockchain platform information, "solidity" as the programming language information, and "0.5.0" as the version information may be extracted.

When input code is a go file (.go) based on Hyperledger Fabric, the meta-information extraction unit 10 extracts programming language information through the extension of the file, and extracts meta-information based on a package imported and an API used by reading the file. Through this process, a blockchain platform may be estimated, thereby extracting meta-information.

The intermediate representation language conversion unit 20 performs a function of converting input code into an intermediate representation language based on the meta-information extracted by the meta-information extraction unit 10. The intermediate representation language becomes basic data for vulnerability analysis, which will be described later.

Figures 3, 4:
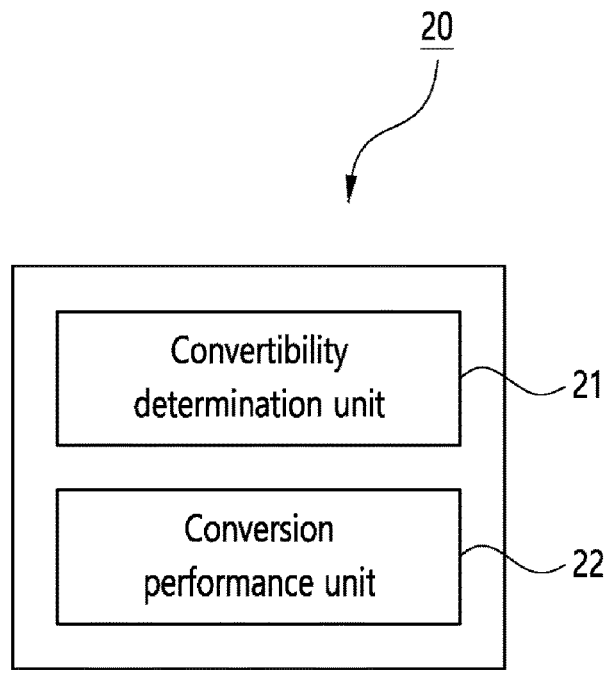
FIG. 3 is a diagram showing the configuration of an intermediate representation language conversion unit (20)
FIG. 4 is a diagram showing the operation of a convertibility determination unit (21)

FIG. 3 is a diagram showing the configuration of the intermediate representation language conversion unit 20.

Referring to FIG. 3, the intermediate representation language conversion unit 20 includes a convertibility determination unit 21 and a conversion performance unit 22.

The convertibility determination unit 21 performs a function of determining whether the input code can be converted into an intermediate representation language based on the meta-information extracted by the meta-information extraction unit 10.

FIG. 4 is a diagram showing the operation of the convertibility determination unit 21.

As shown in FIG. 4, when input code is, e.g., an Ethereum Solidity file (.sol) or a Hyperledger Fabric-based go file (.go), the convertibility determination unit 21 determines that the input code can be converted into an intermediate representation language. Meanwhile, when an unknown blockchain java file (.java) is input code based on the meta-information extracted by the meta-information extraction unit 10, it is determined that the input code cannot be converted into an intermediate representation language.

The convertibility determination unit 21 determines whether conversion into an intermediate representation language is possible based on the programming language information of meta-information. To this end, the convertibility determination unit 21 may store a table indicating whether conversion is possible, as shown in FIG. 4, and may determine whether conversion into an intermediate representation language is possible based on the meta-information of input code.

The conversion performance unit 22 performs a function of converting corresponding input code into an intermediate representation language when the convertibility determination unit 21 determines that the input code can be converted into an intermediate representation language.

The intermediate representation language refers to intermediate code used between a language used in target software and source code, is independent of source code, and can be used by various compilers.

Figure 5:
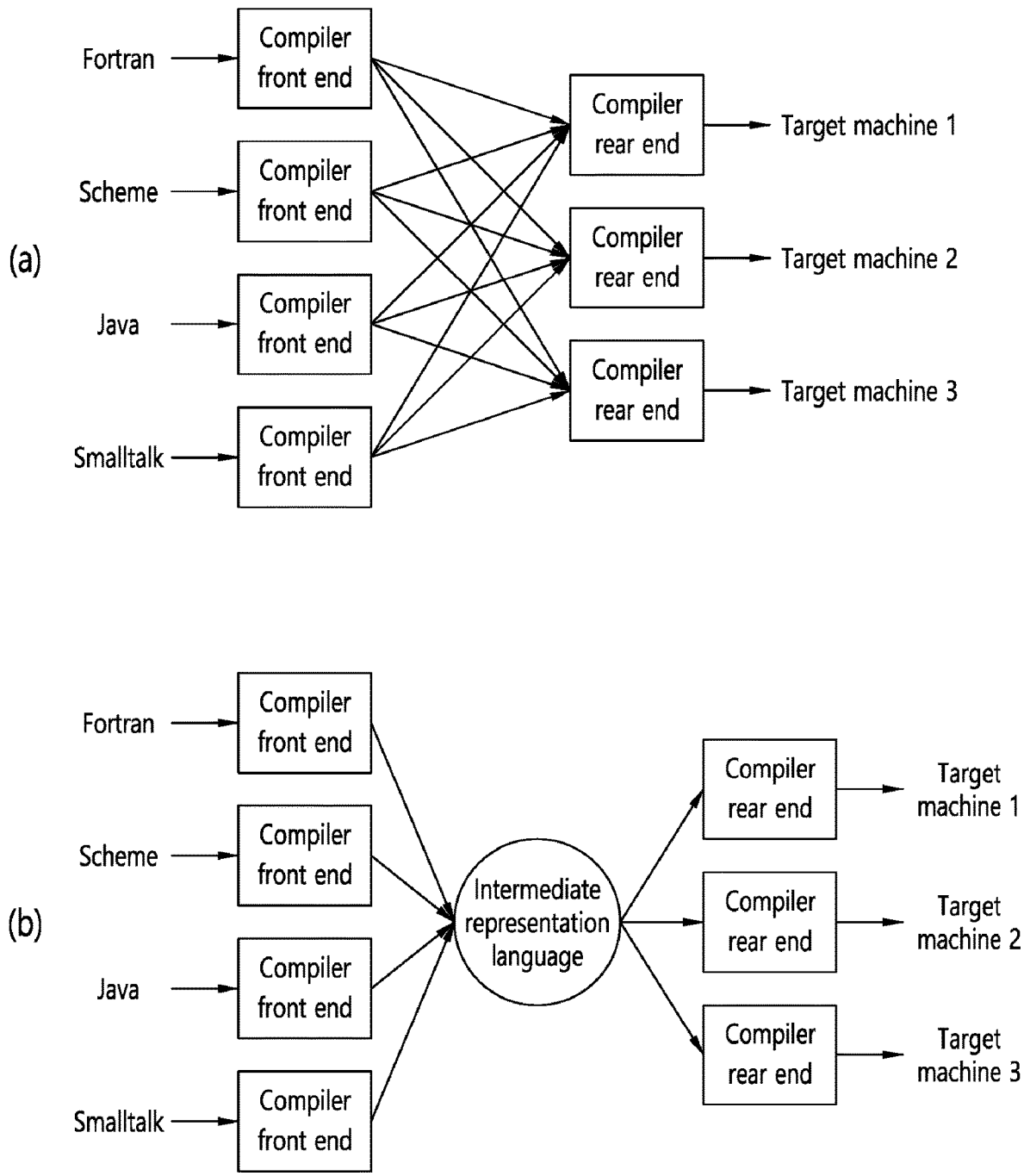
FIG. 5 is a diagram illustrating an intermediate representation language.

FIG. 5 is a diagram illustrating an intermediate representation language.

FIG. 5(*a*) shows compilers that do not use an intermediate representation language. As shown in this drawing, it can be seen that source codes written in various programming languages such as Fortran, Scheme, Java, and Smalltalk are input through respective compiler front ends, and are converted into target machine languages through respective compiler rear ends. Accordingly, N (=4)×M (=3) compilers are required.

Meanwhile, FIG. 5(*b*) shows compilers that use an intermediate representation language. As shown in this drawing, it can be seen that source codes written in various programming languages such as Fortran, Scheme, Java, and Smalltalk are input through compiler front ends, converted into the intermediate representation language, and then converted into target machine languages by respective compiler rear ends. Accordingly, N (=4)+M (=3) compilers are required.

Figures 6, 7:
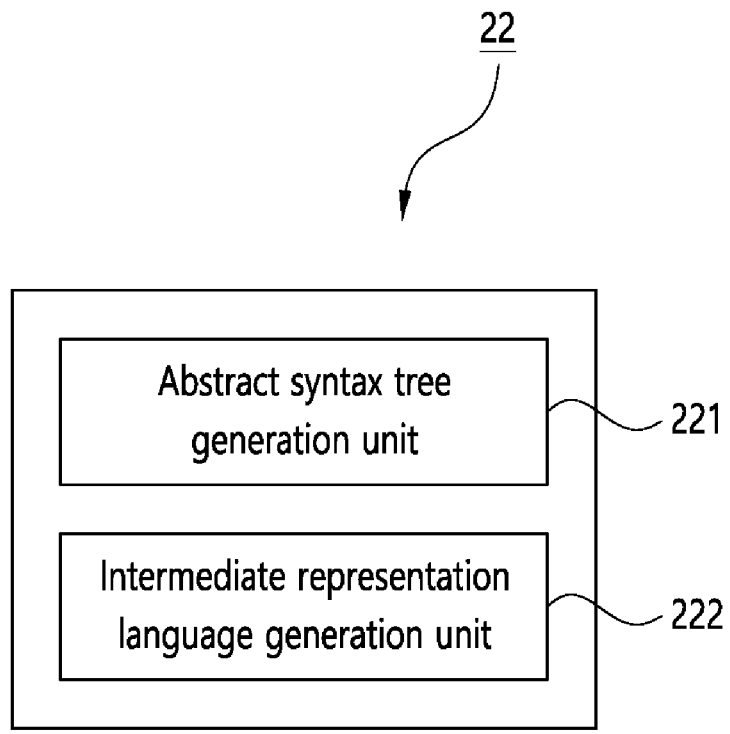
FIG. 6 is a diagram showing one embodiment of the configuration of a conversion performance unit (22)
FIG. 7 shows an example of an abstract syntax tree.

FIG. 6 is a diagram showing an embodiment of the configuration of the conversion performance unit 22.

Referring to FIG. 6, the conversion performance unit 22 includes an abstract syntax tree generation unit 221 and an intermediate representation language generation unit 222.

The abstract syntax tree generation unit 221 performs a function of generating an abstract syntax tree by parsing input code.

The abstract syntax tree refers to a tree-type data structure that is generated through a syntactic parsing process in a source code compilation step. The abstract syntax tree generation unit 221 parses the input code and generates the results of the parsing in the form of a tree.

FIG. 7 shows an example of an abstract syntax tree.

As shown in FIG. 7, in the abstract syntax tree, when input code is 1+2*(3+4) as an example, the input code is parsed into data types, operator types, and symbol types, and they are represented in a tree form.

The intermediate representation language generation unit 222 converts the input code into an intermediate representation language based on the abstract syntax tree generated by the abstract syntax tree generation unit 221.

In this case, the input code is converted into the intermediate representation language by traversing the abstract syntax tree through a visitor. In this case, the visitor may traverse the abstract syntax tree, e.g., in a depth first left-to-right manner, and may convert the input code into the intermediate representation language in accordance with a given rule when reaching each node of the abstract syntax tree. Decorators or double operators, and grammar set for each blockchain platform are desugared. In this case, the intermediate representation language may follow the form of single static assignment in which assignment occurs only once per variable. When the input code is converted into the intermediate representation language, a Pass provided by an LLVM compiler may be utilized.

FIGS. 8 and 9 show an example in which input code is converted into an intermediate representation language by the intermediate representation language generation unit 222.

As shown in FIGS. 8 and 9, it can be seen that various types of input code have been converted to correspond to intermediate representation languages, respectively.

However, the intermediate representation language conversion method described with reference to FIGS. 7 to 9 is illustrative and is not a direct purpose of the present invention, and various other conventionally known methods may be used as well.

When the input code is converted into the intermediate representation language through this process, the intermediate representation language conversion unit 20 transfers the resulting intermediate representation language to the code analysis unit 30.

The code analysis unit 30 is a means for detecting whether there is vulnerable code or a rule violation case by analyzing the input code converted into the intermediate representation language by the intermediate representation language conversion unit 20.

The code analysis unit 30 may include a plurality of code analysis units corresponding to the pieces of meta-information extracted by the meta-information extraction unit 10. As described above, the meta-information includes at least one of blockchain platform information, programming language information, and version information. Accordingly, the intermediate representation language conversion unit 20 transmits input code, converted into an intermediate representation language, to one of the code analysis units 30 corresponding to the meta-information of the input code converted into the intermediate representation language.

Figure 10:
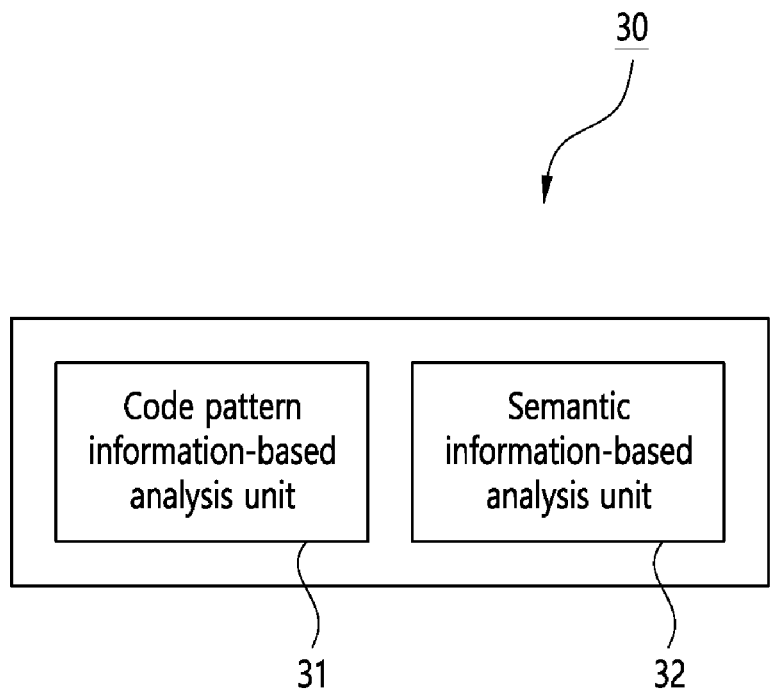
FIG. 10 is a diagram showing the configuration of a code analysis unit (30)

FIG. 10 is a diagram showing the configuration of the code analysis unit 30.

Referring to FIG. 10, the code analysis unit 30 includes a code pattern information-based analysis unit 31 and a semantic information-based analysis unit 32.

The code pattern information-based analysis unit 31 is a means for detecting vulnerable code or a rule violation case based on the code pattern information of input code converted into an intermediate representation language.

Figure 11:
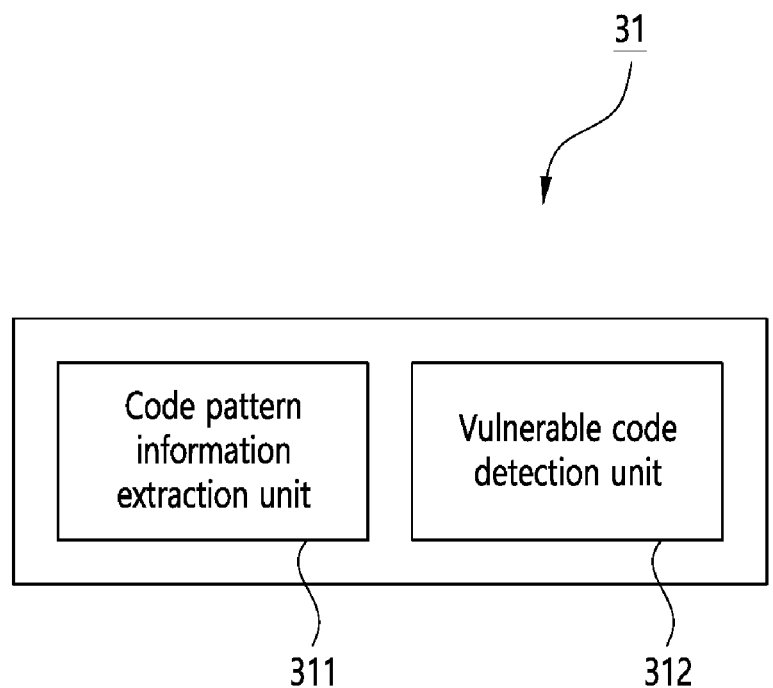
FIG. 11 is a diagram showing an example of the configuration of a code pattern information-based analysis unit (31)

FIG. 11 is a diagram showing an example of the configuration of the code pattern information-based analysis unit 31.

Referring to FIG. 11, the code pattern information-based analysis unit 31 includes a code pattern information extraction unit 311 and a vulnerable code detection unit 312.

The code pattern information extraction unit 311 performs a function of extracting the pattern information of input code converted into and expressed in an intermediate representation language.

In this case, the code pattern refers to a pattern in which the statement of the input code converted into and expressed in the intermediate representation language is divided into preset units.

FIG. 12 shows an example of code pattern information.

As shown in FIG. 12, the code pattern information may include a plurality of types of code pattern information, and code pattern information may be constructed for each type.

In FIG. 12, the code pattern information may include four types of information, and each type of code pattern information may be generated for each code pattern information ID composed of the ID of input code (e.g., a smart contract name, a file name, and/or the like), a blockchain platform, a programming language, a version, and an identifier (No).

In FIG. 12, the first type of code pattern information is obtained by extracting the per-line statement of input code in the form of a list, is composed of an input code ID, a version, a statement, a statement hash value, a start line, and an end line, and is assigned a code pattern information ID composed of "SOOHO_ethereum_solidity_0.4.6_1."

The second type of code pattern information is obtained by extracting the per-function statement of the input code in the form of a list, may be composed of an input code ID, a version, a function name, a function body, a function hash value, a start line, and an end line, and is assigned a code pattern information ID composed of "SOOHO_ethereum_solidity_0.4.6_2."

The third type of code pattern information is obtained by extracting the per-block statement of the input code in the form of a list, may be composed of an input code ID, a version, a function name including a block, a function-based block number, a block body, a block body hash value, a start line, and an end line, and is assigned a code pattern information ID composed of "SOOHO_ethereum_solidity 0.4.6_3."

The fourth type of code pattern information is obtained by extracting the per-token statement of the input code, may be composed of an input code ID, a version, the value of a reference token n, a statement, a statement hash value, a start line, and an end line, and is assigned a code pattern information ID composed of "SOOHO_ethereum_solidity_0.4.6_4." In this case, the token refers to a corpus composed of n consecutive letters.

In the above description, the hash value of each piece of code pattern information may be calculated by, e.g., md5.

As described above, the code pattern information may be extracted from the input code converted into the intermediate representation language on a per-line, per-function, per-block, and/or per-token basis for each language and version of each blockchain platform.

However, the above-described types of code pattern information are illustrative. It is obvious that only some of those may be used and another type of code pattern information may be additionally used.

Referring back to FIG. 11, the vulnerable code detection unit 312 is a means of detecting whether there is vulnerable code or a rule violation case based on the code pattern information, extracted by the code pattern information extraction unit 311, by the method described above.

The vulnerable code detection unit 312 detects whether data that is the same as vulnerable code or rule data organized into a vulnerability database (DB) is present in code pattern information for each code pattern information ID extracted by the code pattern information extraction unit 311. Upon detection, whether vulnerable code present under the same condition is present may be detected by using a conditional statement (e.g., a mysql where statement, and/or the like) provided by the vulnerability database. Once vulnerable code has been detected, the vulnerable code detection unit 312 generates a code pattern-based vulnerability table for each code pattern information ID.

The code pattern-based vulnerability table may be generated in a one-to-many manner, with the overall source code and line information (a start line and an end line) of input code determined to be vulnerable code being used as input and each code pattern information ID being set as an entity in the vulnerability database.

The vulnerability database is generated using the method described in conjunction with the meta-information extraction unit 10, the intermediate representation language conversion unit 20, and the code pattern information extraction unit 311, as described above. In other words, meta-information may be extracted by using vulnerable code and the line information of the vulnerable code as input, the input vulnerable code may be converted into an intermediate representation language based on the extracted meta-information, and code pattern information may be extracted based on the line information of the vulnerable code and stored in the vulnerability database.

When the vulnerability database is generated in this manner, the vulnerable code detection unit 312 detects whether there is vulnerable code or a rule violation case by making a query to the vulnerability database using the code pattern information ID. In this case, for rapid retrieval, for example, a query may be made using "the code pattern information ID & md5" as a pair with an index set therein.

Referring back to FIG. 10, the semantic information-based analysis unit 32 will be described.

The semantic information-based analysis unit 32 is a means for extracting the semantic information of input code converted into an intermediate representation language and detecting vulnerable code or a rule violation case based on the extracted semantic information.

FIG. 13 is a diagram showing an example of the configuration of the semantic information-based analysis unit 32.

Referring to FIG. 13, the semantic information-based analysis unit 32 includes a semantic information extraction unit 321 and a vulnerable code detection unit 322.

The semantic information extraction unit 321 performs a function of extracting semantic information from input code expressed in an intermediate representation language.

In this case, the semantic information is information about the execution of the input code, and has a concept distinguished from that of syntactic information. The semantic information may include at least one of variable tracking information, execution flow information, and conditional expression information.

The semantic information extraction unit 321 may generate semantic information by reading the statement of input code converted into an intermediate representation language to extract semantic information and then storing data in a data structure having a table or graph form.

FIG. 14 is a diagram illustrating the operation of the semantic information extraction unit 321, and is intended to illustrate a process of extracting variable tracking information.

As shown in FIG. 14, the semantic information extraction unit 321 extracts and stores variable tracking information using a variable management table and a variable value table.

When individual variables are declared in input code converted into an intermediate representation language, they are added to the variable management table.

However, since the input code in the present invention is a smart contract, a specific variable is managed through a separate flag, unlike a general variable management table, to analyze the vulnerability of the smart contract.

In addition, the range of values that can be expressed by a variable may be changed by a conditional expression. Information about this is also managed in the variable value table.

For example, table[x]=$(-\infty,\infty)$ when the variable x can have any value, table[x]=$(0,\infty)$ when the variable x is equal to or larger than 0, and table[x]=$(-100, 100)$ when the variable x is equal or larger than −100 and smaller than and equal to 100. This information is extracted and then stored and managed in the variable value table.

Figure 15:
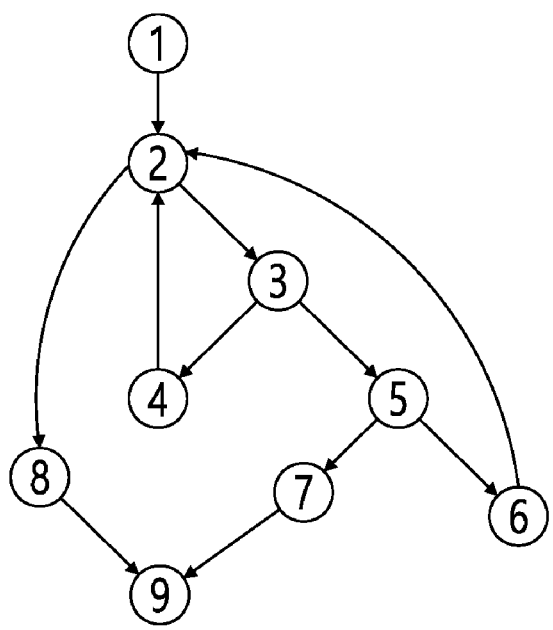
FIG. 15 is intended to illustrate a process in which the semantic information extraction unit (321) extracts execution flow information.

FIG. 15 is intended to illustrate a process in which the semantic information extraction unit 321 extracts execution flow information.

As shown in this drawing, the semantic information extraction unit 321 generates and stores a control flow graph representative of execution flow information. When a branch occurs in input code, a node is generated and connected.

The vulnerable code detection unit 322 is a means for detecting whether there is vulnerable code or a rule violation case based on the semantic information generated by the semantic information extraction unit 321 through the above-described process.

FIG. 16 is a diagram illustrating the operation of the vulnerable code detection unit 322.

The vulnerable code detection unit 322 may detect if there is vulnerable code or a rule violation case based on the variable tracking information and execution flow information generated by the semantic information extraction unit 321.

FIG. 16(a) illustrates a process of determining whether code in question corresponds to vulnerable code or a rule violation case set in advance using variable tracking information.

For example, when variable value information corresponds to an integer overflow or an uninitialized variable, the code may be detected as vulnerable code. Since the input code is a smart contract, vulnerable code may be detected by determining, e.g., whether the representation value of a variable is a block.timestamp value or whether a balance is equal to or smaller than 0.

FIG. 16(b) illustrates a process of determining whether code in question corresponds to vulnerable code or a rule violation case using a control flow graph (CFG).

For example, when an unreachable node is present in a CFG, the code may be detected as vulnerable code.

Furthermore, since the input code is a smart contract, code in question may be determined to be vulnerable code when a number of nodes larger than a preset value are present in a CFG. The reason for this is that when an excessively large number of nodes are present in a smart contract, gas consumption increases on a blockchain platform, so that there may be a case that does not operate at all, as in denial of service.

Furthermore, when an external smart contract is called (e.g., in the case of .call, .delegate, .send, or the like) even though a node in question is not a leaf node, this case corresponds to reentrancy, so that code in question may be detected as vulnerable code.

The vulnerable code detection unit 322 records vulnerable code or a rule violation case in a semantic vulnerability table whenever the vulnerable code or the rule violation case is detected.

Referring back to FIG. 1, the vulnerability detection unit 40 will be described.

The vulnerability detection unit 40 is a means for finally detecting the vulnerabilities of input code based on the vulnerable codes and rule violation cases detected by the code analysis unit 30 and generating a final vulnerability model.

The vulnerability detection unit 40 generates a final vulnerability model by, for the vulnerabilities detected based on the vulnerabilities and rule violation cases detected by the code pattern information-based analysis unit 31 and semantic information-based analysis unit 32 of the code analysis unit 30, 1) generating a vulnerability model by modifying it with a consistent vulnerability information schema, 2) removing duplicates, and 3) performing prioritization, as described above.

Figure 17:
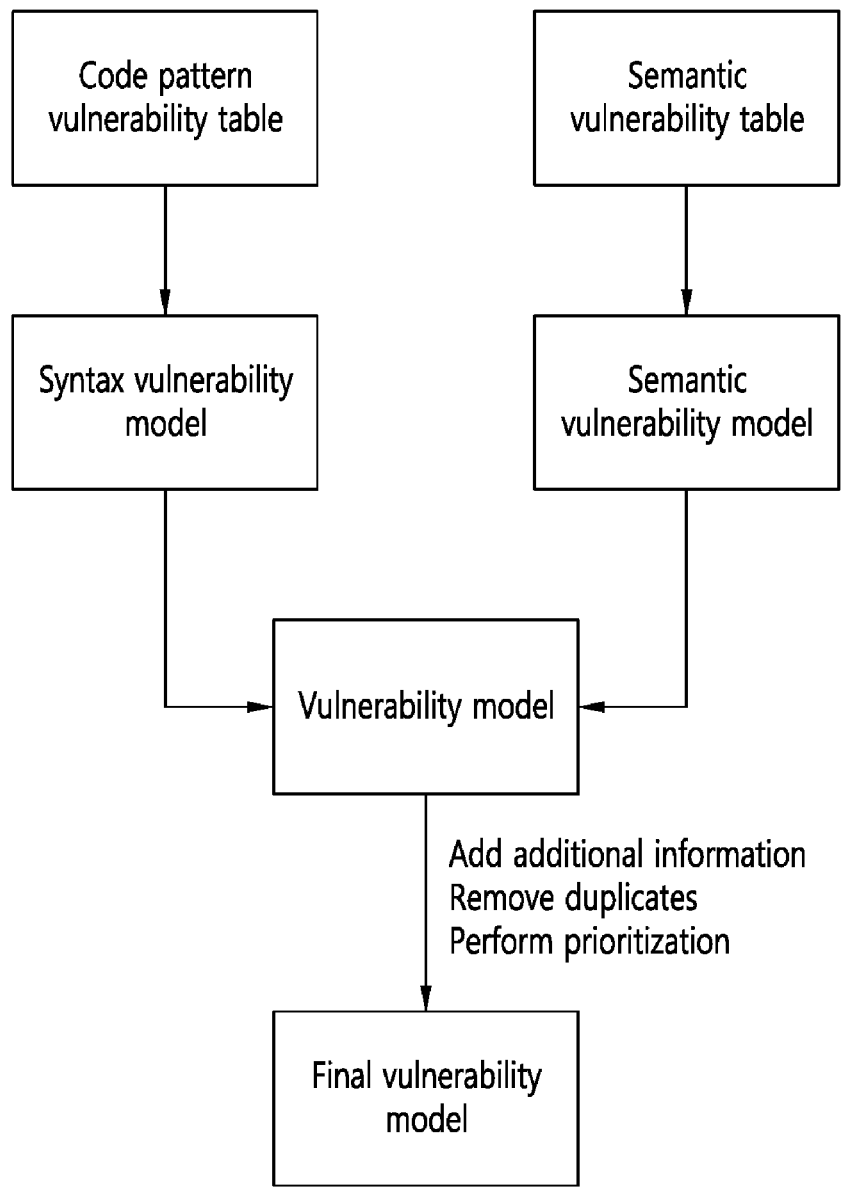

FIGS. 17 and 18 are diagrams illustrating the operation of the vulnerability detection unit 40.

The vulnerability detection unit 40 generates a syntactic vulnerability model while traversing individual pieces of vulnerability information in the form of an array recorded in a code pattern vulnerability table generated by the vulnerability code detection unit 312 of the code pattern information-based analysis unit 31, as described above.

In addition, the vulnerability detection unit 40 generates a semantic vulnerability model while traversing individual pieces of vulnerability information in the form of an array recorded in a semantic vulnerability table generated by the vulnerable code detection unit 322 of the semantic information-based analysis unit 32, and merges these two models together, thereby generating a vulnerability model including all vulnerability results.

Then, the vulnerability detection unit 40 generates a final vulnerability model by adding additional information to the vulnerability model, removing duplicates, and performing prioritization.

In this case, the added information may include information such as severity information, references, patch information, and the like.

FIG. 18 is a diagram illustrating a process of generating a final vulnerability model.

The vulnerability detection unit 40 may add additional information to the vulnerability model generated as described above, as shown in FIG. 18.

Referring to FIG. 18, the additional information may include severity information, references, and patch information.

The severity information is information indicative of how serious a corresponding vulnerability is. It is classified as "Critical, High, or Medium" depending on the severity, and is recorded as "Note" by default.

The references are information about references to external vulnerability databases that provide vulnerability information such as CVE (Common Vulnerabilities and Exposures) and SWC.

In addition, the patch information may include information for supplementing the corresponding vulnerability such as a patch method, a patch file, and/or the like.

In addition, as shown in FIG. 18, a vulnerability model is generated by information such as a vulnerability name for identifying the corresponding vulnerability, a CWE-based vulnerability classification ID, a SWC-based vulnerability classification ID, and the start and end lines of vulnerability-related code.

Through this process, the vulnerability detection unit 40 may generate a vulnerability model having a consistent vulnerability information schema.

Next, the vulnerability detection unit 40 may use the following method in order to remove duplicates from the vulnerability model.

In other words, when parts A and B of the resulting input code detected as vulnerabilities are present, a corresponding part may be determined as a duplicate and removed in the following cases.

1) When parts A and B are the same type of vulnerabilities and part A is included in part B based on the input code, i.e., B.start_line <=A.start_line&&A.end_line <=B.end_line&&
(A.CWE_ID==B.CWE_ID||A.SWC_ID==B.SWC_ID)
In this case, part A of the input code may be removed.
2) When part A and part B have the same patch information,
A.patch_information==B.patch_information
In this case, either part A or part B of the input code may be removed.
3) When parts A and B differ only in patch information, patch information having a large array index is appended to patch information having a short array index.

Next, the vulnerability detection unit 40 performs prioritization, which may use the following rules.

In other words, a case where patch information is present for vulnerabilities classified as "Critical," which corresponds to the most dangerous level of the severity information is arranged in the highest order position, and a case where patch information is not present is arranged in the next highest order position.

Next, cases where patch information is present and severity information is "High," "Medium," or "Low" are arranged in the next order positions. This means that when patch information is present, cases are arranged in descending order of severity information.

Then, cases where patch information is not present and severity information is "High," "Medium," or "Low" are arranged in the next order positions.

Furthermore, a case where patch information is present and severity information is "Note" and a case where patch information is not present and severity information is "Note" are arranged in the next order positions.

Through this process, the vulnerability detection unit 40 may provide final vulnerability result information by generating a vulnerability model representative of the vulnerabilities of input code based on the vulnerable codes and rule violation cases detected by the code pattern information-based analysis unit 31 and the semantic information-based analysis unit 32 of the code analysis unit 30, generating a final vulnerability model including patch information, severity information, and references as additional information related to the vulnerabilities, and then removing duplicates and performing prioritization.

Figure 19:
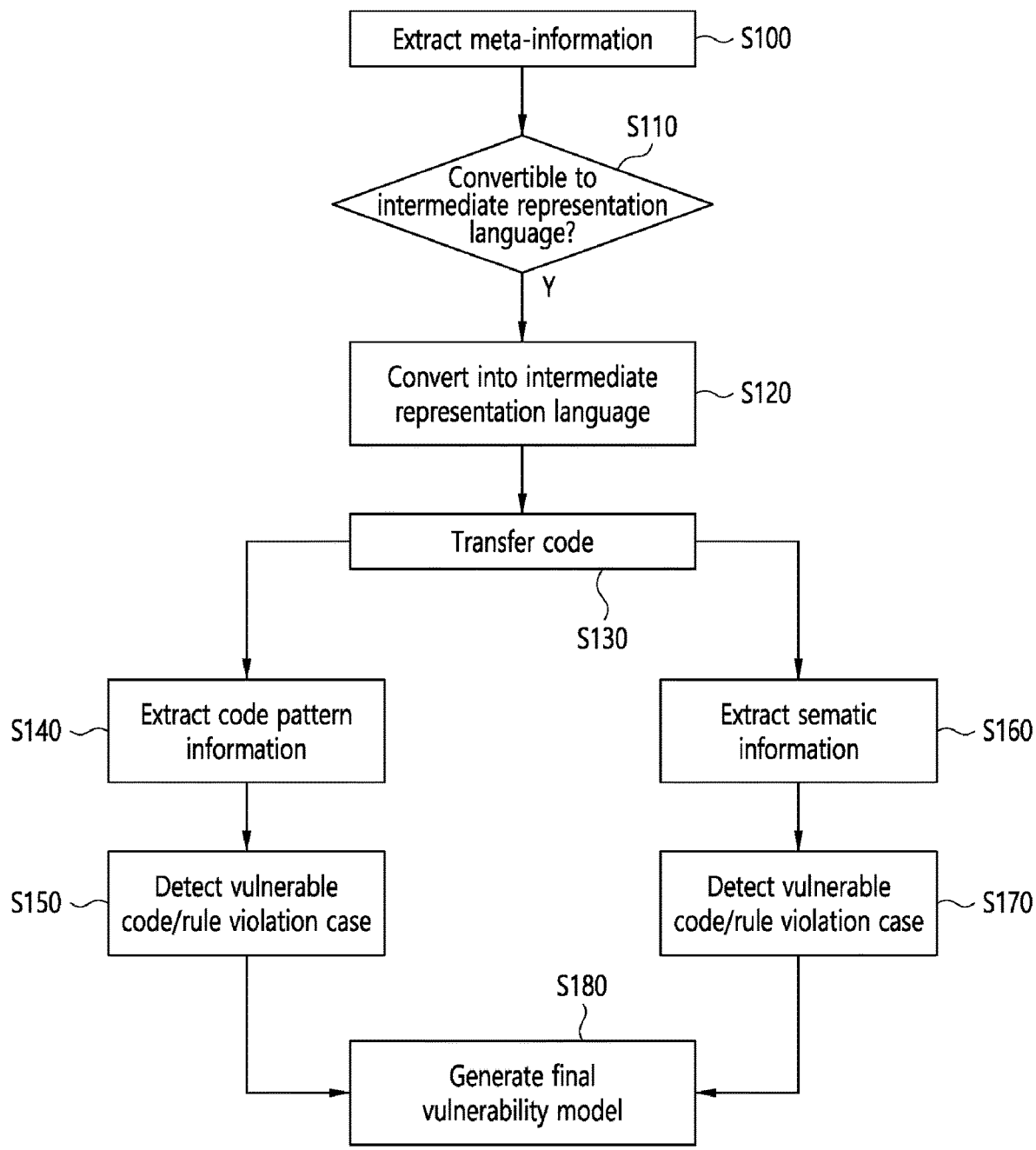
FIG. 19 is a flowchart illustrating an embodiment of a method for analyzing the vulnerabilities of smart contract code performed by the analysis apparatus (100) according to the present invention.

FIG. 19 is a flowchart illustrating an embodiment of a method for analyzing the vulnerabilities of smart contract code performed by the analysis apparatus 100 according to the present invention described with reference to FIGS. 1 to 18.

Referring to FIG. 19, the meta-information extraction unit 10 extracts meta-information about input code, as described above, in step S100.

Then, the convertibility determination unit 21 of the intermediate representation language conversion unit 20 determines whether the input code can be converted into an intermediate representation language based on the meta-information, extracted by the meta-information extraction unit 10, in step S110.

When it is determined that the conversion can be performed, the conversion performance unit 22 of the intermediate representation language conversion unit 20 converts the input code into the intermediate representation language using the method described above in step S120.

Thereafter, the intermediate representation language conversion unit 20 transfers the input code, converted into the intermediate representation language, to the code pattern information-based analysis unit 31 and semantic information-based analysis unit 32 of the code analysis unit 30 in step S130.

As described above, the code pattern information-based analysis unit 31 extracts code pattern information and detects vulnerable code or a rule violation case based on the extracted code pattern information in steps S140 and S150. Furthermore, the semantic information-based analysis unit 32 detects vulnerable code or a rule violation case based on semantic information, which is at least one of variable tracking information, execution flow information, and conditional expression information, in steps S160 and S170.

In addition, the vulnerability detection unit 40 generates a final vulnerability model based on a code pattern vulnerability table and a semantic vulnerability table for vulnerabilities detected by the code pattern information-based analysis unit 31 and the semantic information-based analysis unit 32, as described above, in step S180.

While the present invention has been described with reference to preferred embodiments according to the present invention, it is obvious that the present invention is not limited to the embodiments but various modifications and alterations may be made.

The invention claimed is:

1. An apparatus for analyzing vulnerabilities of smart contract code, the apparatus comprising a non-transitory medium storing program code configured to implement:
    a meta-information extraction unit configured to extract meta-information about input code, which is source code of a smart contract;
    an intermediate representation language conversion unit configured to convert the input code into an intermediate representation language based on the meta-information extracted by the meta-information extraction unit;
    a code analysis unit configured to detect whether there is vulnerable code or a rule violation case by analyzing the input code converted into the intermediate representation language by the intermediate representation language conversion unit; and
    a vulnerability detection unit configured to generate a final vulnerability model by detecting a vulnerability based on the vulnerable code or the rule violation case detected by the code analysis unit.

2. The apparatus of claim 1, wherein the meta-information comprises at least one of blockchain platform information, programming language information, and version information.

3. The apparatus of claim 1, wherein the intermediate representation language conversion unit comprises:
    a convertibility determination unit configured to determine whether the input code can be converted into an intermediate representation language based on the meta-information extracted by the meta-information extraction unit; and
    a conversion performance unit configured to convert the input code into an intermediate representation language when it is determined by the convertibility determination unit that the input code can be converted into an intermediate representation language.

4. The apparatus of claim 3, wherein the conversion performance unit comprises:
    an abstract syntax tree generation unit configured to generate an abstract syntax tree by parsing the input code; and
    an intermediate representation language generation unit configured to generate an intermediate representation language for the input code by traversing the abstract syntax tree, generated by the abstract syntax tree generation unit, through a visitor.

5. The apparatus of claim 1, wherein the code analysis unit comprises a number of code analysis units corresponding to a number of pieces of the meta-information extracted by the meta-information extraction unit.

6. The apparatus of claim 1, wherein the code analysis unit comprises:
   a code pattern information-based analysis unit configured to detect whether there is vulnerable code or a rule violation case based on code pattern information of the input code converted into the intermediate representation language; and
   a semantic information-based analysis unit configured to detect whether there is vulnerable code or a rule violation case based on at least one of variable tracking information, execution flow information, and conditional expression information of the input code converted into the intermediate representation language.

7. The apparatus of claim 6, wherein the code pattern information-based analysis unit comprises:
   a code pattern information extraction unit configured to extract the code pattern information of the input code converted into the intermediate representation language; and
   a vulnerable code detection unit configured to detect whether there is a vulnerable code or a rule violation case based on the code pattern information extracted by the code pattern information extraction unit.

8. The apparatus of claim 7, wherein the code pattern information extraction unit extracts code pattern information, including a statement extracted on a per-line, per-function, per-block, and/or per-token basis from the input code converted into and expressed in the intermediate representation language, and a hash value, start line information and end line information of the extracted statement.

9. The apparatus of claim 7, wherein the vulnerable code detection unit detects whether data that is the same as vulnerable code or rule data organized in a vulnerability database is present in the code pattern information extracted by the code pattern information extraction unit.

10. The apparatus of claim 9, wherein the vulnerability database is generated by extracting meta-information by using vulnerable code and line information of the vulnerable code as input, converting the input vulnerable code into the intermediate representation language based on the extracted meta-information, and extracting the code pattern information based on the line information of the vulnerable code.

11. The apparatus of claim 4, wherein the semantic information-based analysis unit comprises:
   a semantic information extraction unit configured to extract semantic information including at least one of variable tracking information, execution flow information, and conditional expression information from the input code converted into and expressed in the intermediate representation language; and
   a vulnerable code detection unit configured to detect whether there is vulnerable code or a rule violation case based on the semantic information generated by the semantic information extraction unit.

12. The apparatus of claim 11, wherein the semantic information extraction unit generates the variable tracking information by, when each variable is declared in the input code converted into the intermediate representation language, adding each variable to a variable management table and storing a range of values, which can be expressed by each variable, in a variable value table for each variable.

13. The apparatus of claim 12, wherein the vulnerable code detecting unit detects a case where the variable value information included in the variable tracking information is an integer overflow or an uninitialized variable, a case where a representation value of a variable is a block.timestamp value, or a case where a balance is equal to or smaller than 0 as vulnerable code or a rule violation case.

14. The apparatus of claim 11, wherein the semantic information extraction unit generates and stores a control flow graph representative of the execution flow information.

15. The apparatus of claim 14, wherein the vulnerable code detection unit detects a case where an unreachable node is present in the control flow graph, a case where a number of nodes larger than a preset value is present, or a case where an external smart contract is called even though it is not a leaf node as vulnerable code or a rule violation case.

16. The apparatus of claim 1, wherein the vulnerability detection unit generates a final vulnerability model by, for detected vulnerability based on the code vulnerability or the rule violation case detected by the code analysis unit, generating a vulnerability model, removing duplicates, and performing prioritization.

17. The apparatus of claim 16, wherein the vulnerability detection unit generates a vulnerability model by generating a syntactic vulnerability model from vulnerability information recorded in the code pattern vulnerability table generated by the vulnerable code detection unit of the code pattern information-based analysis unit, generating a semantic vulnerability model from vulnerability information recorded in the semantic vulnerability table generated by the vulnerable code detection unit of the semantic information-based analysis unit, representing the vulnerability model using the two models, and then adding additional information including severity information, references, and patch information.

18. The apparatus of claim 17, wherein the vulnerability detection unit, when parts of the input code detected as vulnerabilities have a same type of vulnerability and one of the parts is included in a remaining part, determines the one part of the input code included in the remaining part to be duplicate and removes the one part, and, when parts of the input code having same patch information are present, determines any one of them to be duplicate and removes the any one part.

19. The apparatus of claim 18, wherein the vulnerability detection unit arranges cases where patch information is present for vulnerabilities classified as "Critical," which corresponds to a most dangerous level of the severity information, in a highest order position, and arranges a case where patch information is not present in a next highest order position.

20. The apparatus of claim 19, wherein the vulnerability detection unit generates the final vulnerability model by arranging cases where patch information is present and severity information is "High," "Medium," or "Low" in next order positions, arranging cases where patch information is present and severity information is "High," "Medium," or "Low" in next order positions, and arranging cases where patch information is not present and severity information is "High," "Medium," or "Low" in next order positions.

21. A method for analyzing vulnerabilities of a smart contract code, the method being performed by the apparatus for analyzing vulnerabilities of smart contract code set forth in claim 1, the method comprising:

a first step of extracting meta-information about input code, which is source code of a smart contract;

a second step of converting the input code into an intermediate representation language based on the meta-information extracted in the first step;

a third step of detecting whether there is vulnerable code or a rule violation case by analyzing the input code converted into the intermediate representation language in the second step; and a fourth step of generating a final vulnerability model by detecting a vulnerability based on the vulnerable code or the rule violation case detected in the fourth step.

* * * * *